United States Patent
Ette

(10) Patent No.: US 12,061,250 B2
(45) Date of Patent: Aug. 13, 2024

(54) METHOD FOR DETECTING PEOPLE AND/OR OBJECTS IN THE INTERIOR OF A MOTOR VEHICLE AND MOTOR VEHICLE

(71) Applicant: VOLKSWAGEN AKTIENGESELLSCHAFT, Wolfsburg (DE)

(72) Inventor: Bernd Ette, Wolfsburg (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 350 days.

(21) Appl. No.: 17/386,771

(22) Filed: Jul. 28, 2021

(65) Prior Publication Data

US 2022/0035017 A1   Feb. 3, 2022

(30) Foreign Application Priority Data

Jul. 30, 2020  (DE) ..................... 10 2020 209 650.3

(51) Int. Cl.
*G01S 13/04*    (2006.01)
*G01S 13/42*    (2006.01)

(52) U.S. Cl.
CPC ............. *G01S 13/04* (2013.01); *G01S 13/42* (2013.01)

(58) Field of Classification Search
CPC ................................ G01S 13/04; G01S 13/42
See application file for complete search history.

(56) References Cited

U.S. PATENT DOCUMENTS

| | | | |
|---|---|---|---|
| 6,462,701 B1 | 10/2002 | Finn | |
| 10,306,650 B2 | 5/2019 | Zielinski et al. | |
| 10,863,451 B2 | 12/2020 | Cenanovic et al. | |
| 2007/0262574 A1 | 11/2007 | Breed et al. | |
| 2009/0046538 A1 | 2/2009 | Breed et al. | |
| 2016/0001728 A1* | 1/2016 | Schräbler | G01S 13/04 342/28 |
| 2019/0193680 A1* | 6/2019 | Ette | G08B 25/08 |
| 2021/0052176 A1* | 2/2021 | Sarely | G01S 13/04 |

(Continued)

FOREIGN PATENT DOCUMENTS

| | | | | |
|---|---|---|---|---|
| DE | 10237331 A1 * | 3/2004 | | B60Q 9/006 |
| DE | 10237331 A1 | 3/2004 | | |

(Continued)

OTHER PUBLICATIONS

Infsoft; Indoor Positioning Using Infosoft UWB Tags; downloaded prior to Jul. 30, 2020 from https://www/infsoft.com/technology/transmitter-hardware/infsoft-uwb-tags.

(Continued)

*Primary Examiner* — Vladimir Magloire
*Assistant Examiner* — Noah Yi Min Zhu
(74) *Attorney, Agent, or Firm* — Barnes & Thornburg LLP

(57) ABSTRACT

A method for detecting people and/or objects in the interior of a transportation vehicle, wherein people and/or objects in the interior of the transportation vehicle are detected by at least two UWB antennas which are each arranged in or on different doors of the transportation vehicle and used for communication with at least one ID transmitter and/or a remote control, at least for locking and unlocking the doors, and wherein signals acquired using the at least two UWB antennas are evaluated via a control device and an evaluation result is delivered. Also disclosed is a transportation vehicle.

20 Claims, 1 Drawing Sheet

(56) References Cited

U.S. PATENT DOCUMENTS

2021/0080562 A1* 3/2021 Chabaud ............... G01S 13/931
2022/0268886 A1* 8/2022 Shamsinejad .......... G01R 29/10

FOREIGN PATENT DOCUMENTS

| | | |
|---|---|---|
| DE | 102013201836 A1 | 8/2014 |
| DE | 102016213689 A1 | 2/2018 |
| DE | 102017215864 B3 | 3/2019 |
| DE | 102017216239 A1 | 3/2019 |
| EP | 1915309 A2 | 4/2008 |
| EP | 2157665 A1 | 2/2010 |
| WO | 0242124 A2 | 5/2002 |

OTHER PUBLICATIONS

Search Report for European Patent Application No. 21183971.7; Feb. 16, 2022.

* cited by examiner

METHOD FOR DETECTING PEOPLE AND/OR OBJECTS IN THE INTERIOR OF A MOTOR VEHICLE AND MOTOR VEHICLE

PRIORITY CLAIM

This patent application claims priority to German Patent Application No. 10 2020 209 650.3, filed 30 Jul. 2020, the disclosure of which is incorporated herein by reference in its entirety.

SUMMARY

Illustrative embodiments relate to a method for detecting persons and/or objects in the interior of a transportation vehicle and a transportation vehicle.

BRIEF DESCRIPTION OF THE DRAWINGS

The disclosed embodiments are described in greater detail with reference to the figures. In the drawings.

DETAILED DESCRIPTION

Figure 1:
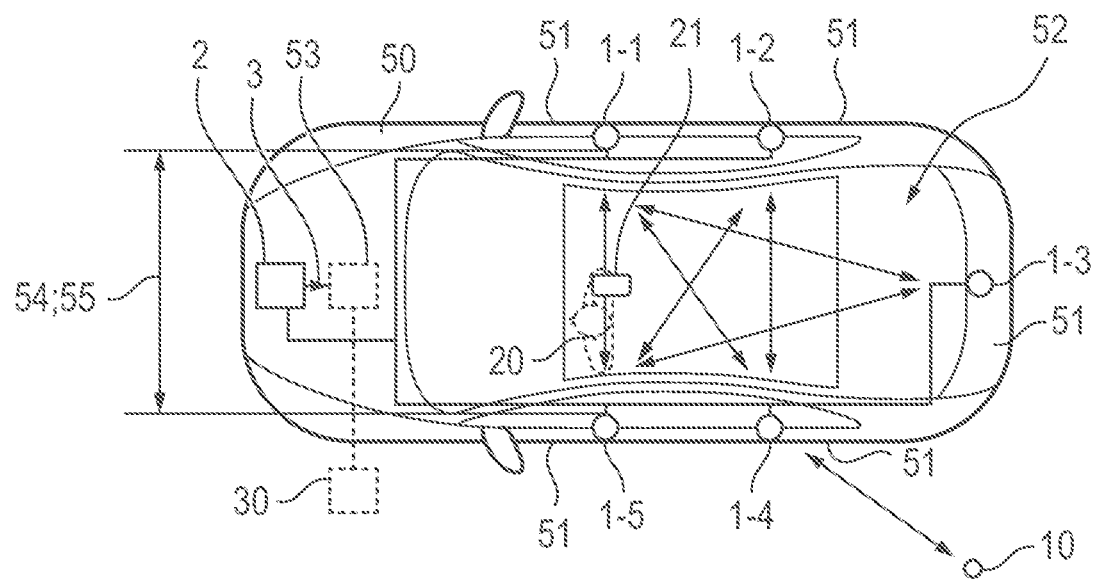
FIG. 1 shows a schematic representation of an exemplary embodiment of the transportation vehicle wherein the active operating mode of the UWB antennas is shown schematically.

It is known to detect the presence and condition of persons in the interior of a transportation vehicle by sensors. Solutions are known that use ultrasonic or radar sensors. Detection by a camera is also known.

EP 2 157 665 A1 discloses a UWB antenna for transport. The UWB antenna comprises a metal screen, a dielectric substrate and a rectangularly imprinted metal patch. The dielectric substrate is arranged on the printed metal patch. The printed metal patch is arranged on the dielectric substrate and has a horizontal trench gap and two vertical trench gaps. The horizontal trench gap runs parallel to the long side of the rectangularly imprinted metal patch, and the vertical trench gaps each extend upwards from each end of the horizontal trench gap to form two resonance contours, in other words, the trench gaps for a U-shaped slot.

The disclosed embodiments provide a method for detecting persons and/or objects in the interior of a transportation vehicle and a transportation vehicle. This is achieved by a disclosed method and a transportation vehicle.

In particular, a method for detecting persons and/or objects in the interior of a transportation vehicle is provided, wherein persons and/or objects in the interior of the transportation vehicle are detected by at least two UWB antennas, which are each arranged in or on different doors of the transportation vehicle and used for communication with at least one ID transmitter and/or a remote control, at least for locking and unlocking the doors, and wherein signals acquired using the at least two UWB antennas are evaluated via a control device and an evaluation result is delivered.

In addition, in particular, a transportation vehicle is created, that includes at least two UWB antennas, wherein the at least two UWB antennas are each located in or on different doors of the transportation vehicle, and wherein the at least two UWB antennas are used for communication with at least one ID transmitter and/or a remote control, at least for locking and unlocking the doors, and wherein the at least two UWB antennas are configured to detect persons and/or objects in the interior of the transportation vehicle; and a control device, wherein the control device is configured to evaluate signals acquired by the at least two UWB antennas and to deliver an evaluation result.

The method and the transportation vehicle enable the detection of persons and/or objects in the interior of a transportation vehicle to be improved, in particular, with regard to the effort and production costs of the transportation vehicle. This is effected by using UWB antennas arranged in or on different doors of the transportation vehicle and used to provide remote locking and unlocking, additionally for detecting persons and/or objects in the transportation vehicle interior. For example, a UWB antenna that is installed in a transportation vehicle door and used to communicate with an ID transmitter and/or with a remote control has a transmission and reception angular range, for example, of 160°, directed into an external environment of the transportation vehicle. At the same time, the UWB antenna has a transmission and reception angular range, for example, of 160°, directed into an interior. The UWB antenna can therefore be used for an application outside the transportation vehicle in addition to an application in the interior of the transportation vehicle. Since the UWB antennas are arranged on or in different doors, signals emitted towards the inside pass through the interior of the transportation vehicle and can also be acquired by other antennas of the at least two UWB antennas, e.g., by a UWB antenna arranged on an opposite door. In particular, the UWB antennas are arranged in such a way that they are not covered by metal to the outside; for example, the UWB antennas can be arranged in or on an area directly below a glass window pane of a vehicle door, for example, where a locking button used to be arranged in older transportation vehicles. A UWB antenna can be operated in an active operating mode, in which a communication takes place between one UWB antenna and another UWB antenna. Furthermore, a UWB antenna can also be operated in a passive operating mode, in which a pulse signal is emitted and radiation reflected by persons or objects is detected by the same UWB antenna. The passive operating mode can also be called the radar mode of operation. The signals acquired by the different UWB antennas are evaluated by the control device and an evaluation result is delivered. In particular, a propagation time, a direction-dependent signal weakening (signal attenuation), and/or the reflections from persons and/or objects acquired in the passive operating mode can be evaluated, for example, by merging and/or correlating signals acquired from a plurality of UWB antennas and/or comparing them with reference measurements to derive information about persons and/or objects inside the transportation vehicle in this way. In the simplest case, the evaluation result comprises, for example, information about whether or not a person or an object is located in the interior.

One benefit of the disclosed method and of the disclosed transportation vehicle is that costs for additional sensor devices in the vehicle interior can be saved, because UWB antennas are used that are used anyway for communication with an ID transmitter and/or a remote control for locking and unlocking the doors of the transportation vehicle.

An Ultra Wide Band (UWB) antenna comprises an antenna and a transceiver for sending and receiving ultra-wide band signals. Furthermore, the UWB antenna can also comprise a controller, for example, a microcontroller. A UWB antenna is designed to operate in a frequency range from approximately 3 to approximately 10 GHz.

The control device may be formed individually or collectively as a combination of hardware and software, for example, as program code which is executed on a microcontroller or microprocessor. However, it may also be provided that parts are individually or collectively designed as application-specific integrated circuits (ASIC).

The evaluation can in principle comprise the use of machine learning methods. For example, it is possible to use a (trained) machine learning method for evaluating the signals acquired by the UWB antennas, for example, to estimate seat occupancy and/or other variables or parameters in the transportation vehicle interior.

In at least one disclosed embodiment, it is provided that the detection is carried out in both an active operating mode and in a passive operating mode of the at least two UWB antennas. In the active operating mode, the UWB antennas communicate with each other in pairs. In such a communication, in particular, a received power can be determined. If a reference measurement has been made for an interior of the transportation vehicle without persons or objects present, reference values for a measured power or signal attenuation are available and can be compared with currently recorded or determined values. This can be used to determine, for example, whether or not a person or an object is arranged in a signal path between two UWB antennas. A change in the position of a person or an object in the interior of the transportation vehicle can also be determined by an evaluation of a change in the recorded values, such as a received power or a signal attenuation.

In at least one disclosed embodiment, it is provided that in a passive operating mode, signals emitted by a UWB antenna are also acquired by other UWB antennas, wherein the signals acquired by each of the other UWB antennas are also evaluated. In other words, in the passive operating mode one of the UWB antennas emits, in particular, pulses which (or the reflections thereof) are not only acquired by the transmitting UWB antenna but also by the other UWB antennas. An evaluation may comprise, in particular, determining propagation times and/or signal strengths to infer the presence and/or condition of persons and/or objects in the interior. Since the signals acquired have each traveled along different signal paths through the interior of the transportation vehicle which are influenced by persons and/or objects in the interior, this allows a more detailed image of the interior to be determined.

In at least one disclosed embodiment, it is provided that the evaluation comprises determining a position and/or a change of position of a detected person and/or of a detected object in the interior of the transportation vehicle from the signals acquired by the at least two UWB antennas. The determined position and/or the determined position change can be used, for example, to determine the seat occupation of individual seats of the transportation vehicle. A position can be determined from the reflections in the passive operating mode. A change of position can be determined from a change in the reflections or positions.

In at least one disclosed embodiment, it is provided that the evaluation comprises computing a three-dimensional image of the interior of the transportation vehicle from the signals acquired by the at least two UWB antennas. For example, the computed three-dimensional image can be fed as input data to an assistance or monitoring function of the transportation vehicle.

In at least one disclosed embodiment, it is provided that in an active operating mode of the at least two UWB antennas, at least one distance between the at least two UWB antennas is determined, wherein the at least one determined distance is compared with at least one specified distance value, and wherein the detection of persons and/or objects in the interior of the transportation vehicle is started when the comparison result shows that the specified distance corresponds to the at least one specified distance value. This means that the method can be started, in particular, whenever the doors are closed. The method can therefore be used more efficiently, in particular, in a more targeted and energy-saving manner. Since a distance between the UWB antennas when the doors are closed is known, a comparison can be used to indicate a closed state of the doors.

In at least one disclosed embodiment, it is provided that an identification code of a detected person and/or a detected object is recorded or received, wherein the recorded or received identification code is linked to a determined position of the person and/or a determined position of the object in the interior of the transportation vehicle and transmitted to at least one server. This allows the occupancy state of the seats of a transportation vehicle, such as a taxi or minibus, to be detected and unambiguously assigned to a person. It is therefore possible to determine when a person (or an object) was transported at which position in the transportation vehicle. This can be used, for example, to automate a billing process or to detect and record possible contact paths of people in the context of infection protection. For example, the identification code can be a unique identification code of a person (or an object) and can be acquired or transmitted to the control device via the person's smartphone or a Radio Frequency Identification (RFID) tag on the smartphone or the person (or on the object). In particular, in addition to the identification code and the position, at least one time indication, such as a time stamp or time interval, is transmitted to the server, indicating when and/or how much time the person or object has spent at the specified position in the interior of the transportation vehicle.

In principle, it may also be possible to carry out the method with appropriately arranged UWB antennas in transportation vehicles, such as rail vehicles, ships or aircraft.

In at least one disclosed embodiment, it is provided that further UWB antennas arranged in further, different doors of the transportation vehicle are used in the detection, wherein signals acquired in an active operating mode and/or in a passive operating mode are evaluated tomographically. Suitable tomographic evaluation methods are generally known.

In at least one disclosed embodiment, it is provided that the evaluation comprises determining a body posture and/or at least one physiological quantity of a detected person, and/or determining a size and/or dimensions of a detected object. This allows input data for transportation vehicle assistance functions to be generated and delivered. For example, at least one vital sign of a person, such as a heart rate or a respiration rate, can be determined as a physiological parameter. This is determined, for example, by evaluating an outer contour of the person or object derived from the signals acquired for a person or an object. Methods of machine learning can also be used in the determination.

FIG. 1 shows a schematic representation of an exemplary embodiment of the transportation vehicle 50. The transportation vehicle 50 comprises a UWB antenna 1-$x$ on each door 51. In addition, the transportation vehicle 50 comprises a control device 2 which is connected to the UWB antennas 1-$x$ via signal communication technology, for example, via a CAN bus of the transportation vehicle 50.

The UWB antennas 1-$x$ each comprise antennas (not shown) and transceivers (not shown) and are arranged in or on different doors 51 of the transportation vehicle 50. The UWB antennas 1-$x$ are used for communication with at least one ID transmitter 10 and/or a remote control at least for locking and unlocking the doors 51. However, the UWB antennas 1-*x* are additionally configured to detect persons 20 and/or objects in the interior 52 of the transportation vehicle 50.

The control device 2 is configured to evaluate signals acquired via the UWB antennas 1-*x* and to deliver an evaluation result 3. For example, the delivery of the result can comprise outputting the evaluation result 3, for example, as a digital data packet. For example, the evaluation result 3 can be transmitted to a vehicle controller 53 where it can be used as input data for an assistance or monitoring function.

In the following, an exemplary embodiment of the method for detecting persons and/or objects in the interior 52 of the transportation vehicle 50 is described, which is carried out by the transportation vehicle 50.

In one measure, in an active operating mode in which two of the UWB antennas 1-*x* always communicate with each other in pairs, a field strength measurement is performed for the individual UWB antennas 1-*x*. In particular, this involves cycling through all possible combinations and transmission/reception directions of UWB antennas 1-*x*. In the evaluation, a comparison with reference values recorded for an interior 52 of the transportation vehicle 50 without persons 20 or objects present therein can be used to establish whether persons 20 or objects are located in the individual signal paths between the UWB antennas 1-*x* or in the interior 52 of the transportation vehicle 50, since persons 20 and objects in the signal path will give rise to attenuation and signal weakening. During the evaluation, it may be provided to use known methods of machine learning to also determine positions and/or types of objects, for example, from a combination of the acquired signals.

Figure 2:
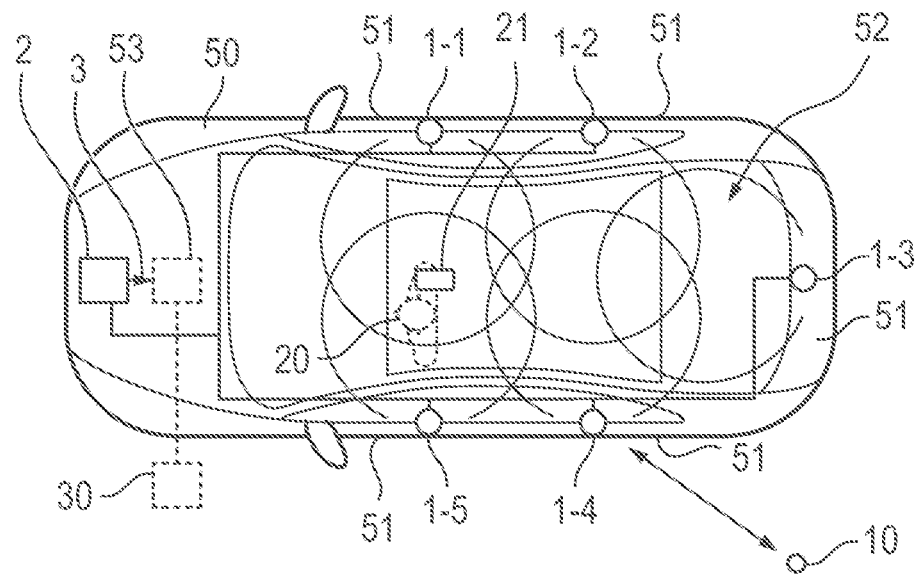
FIG. 2 shows a schematic representation of an exemplary embodiment of the transportation vehicle wherein the passive operating mode of the UWB antennas is shown schematically.

In addition or alternatively, the UWB antennas 1-*x* can be operated in a passive operating mode. This operating mode is shown schematically in FIG. 2. In this case, no communication link is formed between the UWB antennas 1-*x*, rather the UWB antennas 1-*x* are operated in a radar mode in which the transceivers of the individual UWB antennas emit 1-*x* pulses and detect reflections of the pulses caused by persons 20 or objects. From the reflections detected at different positions and from different directions by the different UWB antennas 1-*x*, each representing a three-dimensional image of the immediate environment of the respective UWB antenna 1-*x*, the presence of persons and/or objects in the interior 52 of the transportation vehicle 50 can be inferred. The signals acquired from the UWB antennas 1-*x* can be merged with one another.

So that the detection does not mutually influence the acquisition, it is provided that the detection is carried out in rotation, wherein only one of the UWB antennas 1-*x* transmits at the same time.

The control device 2 evaluates each of the acquired signals and/or the merged signals and from these determines, for example, by a correlation of the acquired signals or by a known method from machine learning, information about whether or not persons 20 or objects are located in the interior 52.

It can be provided that the detection is carried out in both an active operating mode (FIG. 1) and in a passive operating mode (FIG. 2) of the UWB antennas 1-*x*. The signals acquired for each of the two operating modes can also be merged with one another and evaluated as merged signals.

In principle, it is also possible to merge the acquired signals with sensor data from other sensors installed in the interior 52 of the transportation vehicle 50.

It can be provided that in a passive operating mode, signals emitted by a UWB antenna 1-*x* are also acquired by other UWB antennas 1-*x*, wherein the signals acquired by each of the other UWB antennas 1-*x* are also evaluated. This allows a database to be enlarged and thus a more detailed image of the interior 52 to be acquired. In particular, it is provided that the other UWB antennas 1-*x* do not themselves transmit pulses during the time when the UWB antenna 1-*x* in question emits a pulse in the passive operating mode, but instead only detect the pulse emitted by the transmitting antenna 1-*x* and its reflections.

It can be provided that the evaluation comprises determining a position and/or a change of position of a detected person 20 and/or of a detected object in the interior 52 of the transportation vehicle 50 from the signals acquired by the UWB antennas 1-*x*.

It can be provided that the evaluation comprises calculating a three-dimensional image of the interior 52 of the transportation vehicle 50 from the signals acquired by the UWB antennas 1-*x*. For example, a correlation of the recorded signals can be carried out to recognize and image persons 20 and/or objects in the interior 52. Alternatively or in addition, known machine learning methods can also be used to recognize and image persons 20 and/or objects in the interior.

It can be provided that in an active operating mode of the at least two UWB antennas 1-*x* at least one distance 54 between the at least two UWB antennas 1-*x* is determined, wherein the at least one determined distance 54 is compared with at least one specified distance value 55, and wherein the detection of persons 20 and/or objects in the interior 52 of the transportation vehicle 50 is started when the comparison result shows that the determined distance 54 corresponds to the at least one specified distance value 55. This will start the method whenever the doors 51 of the transportation vehicle 50 are closed. The specified at least one distance value 55 corresponds to a distance between the UWB antennas 1-*x* in question when the doors 51 are closed. The comparison takes into account any measurement tolerances present. In particular, the method can be started whenever it is determined that all the determined distances 54 each correspond to specified distance values 55, i.e., when it is determined that all doors 51 of the transportation vehicle 50 are closed.

It may be provided that an identification code 21 of a detected person 20 and/or of a detected object is recorded or received, wherein the recorded or received identification code 21 is linked to a determined position of the person 20 and/or a determined position of the object in the interior 52 of the transportation vehicle 50 and transmitted via the control device 2, for example, via a communication interface (not shown) of the transportation vehicle, to at least one server 30.

It may be provided that signals acquired in an active operating mode and/or in a passive operating mode are evaluated tomographically by the control device 2. Such a process will use known tomographic evaluation methods.

It can be provided that the evaluation comprises determining a body posture and/or at least one physiological quantity of a detected person 20, and/or determining a size and/or dimensions of a detected object. In doing so, the control device 2 also evaluates a change in the acquired signals over multiple time actions. In this way, for example, a respiration rate can be determined via the raising and lowering of the chest of a detected person 20 etc.

LIST OF REFERENCE SIGNS

1-*x* UWB antenna
2 control device 3 evaluation result
10 ID transmitter
20 person
21 identification code
30 server
50 transportation vehicle
51 door
52 vehicle interior
53 vehicle controller
54 distance
55 specified distance value

The invention claimed is:

1. A transportation vehicle comprising:
at least two Ultra-WideBand (UWB) antennas each located in or on different doors of the transportation vehicle, wherein the at least two UWB antennas are used for communication with at least one ID transmitter and/or a remote control, at least for locking and unlocking the doors, and wherein the at least two UWB antennas are also used to acquire signals indicating detection of people and/or objects in an interior of the transportation vehicle; and
a control device configured to evaluate the signals acquired by the at least two UWB antennas to generate an evaluation result indicating detection of people and/or objects in the interior of the transportation vehicle,
wherein the evaluation of the signals analyzes reflections of the signals acquired by the at least two UWB antennas by merging signals acquired from the at least two UWB antennas, wherein signals detected in both an active operating mode and a passive operating mode are merged with one another and evaluated as merged signals to derive information about persons and/or objects in the transportation vehicle interior.

2. The transportation vehicle of claim 1, wherein, in the passive operating mode, signals emitted by at least one of the at least two UWB antennas are also acquired by UWB antennas other than the at least two UWB antennas, wherein the signals acquired by each of the other UWB antennas are also evaluated by the control device to generate the evaluation result.

3. The transportation vehicle of claim 1, wherein the evaluation comprises determining a position and/or a change of position of a detected person and/or of a detected object in the interior of the transportation vehicle based on the signals acquired by the at least two UWB antennas.

4. The transportation vehicle of claim 1, wherein the evaluation comprises computing a three-dimensional image of the interior of the transportation vehicle from the signals acquired by the at least two UWB antennas.

5. The transportation vehicle of claim 1, wherein, in the active operating mode of the at least two UWB antennas, at least one distance between the at least two UWB antennas is determined, wherein the at least one distance determined is compared with at least one specified distance value, and wherein the detection of people and/or objects in the interior of the transportation vehicle is started when the comparison result shows that the determined distance corresponds to the at least one specified distance value.

6. The transportation vehicle of claim 1, wherein an identification code of a detected person and/or of a detected object is recorded or received, wherein the recorded or received identification code is linked to a determined position of the person and/or a determined position of the object in the interior of the transportation vehicle and transmitted to at least one server.

7. The transportation vehicle of claim 1, wherein further UWB antennas other than the at least two UWB antennas are arranged in further, different doors of the transportation vehicle and are used during the detection, wherein signals acquired in an active operating mode and/or in a passive operating mode are evaluated tomographically.

8. The transportation vehicle of claim 1, wherein the evaluation comprises determining a body posture and/or at least one physiological quantity of a detected person, and/or determining a size and/or dimensions of a detected object.

9. The transportation vehicle of claim 1, wherein the evaluation of the signals also analyzes propagation time and/or a direction-dependent signal attenuation.

10. The transportation vehicle of claim 1, wherein the evaluation analysis of the signals by reflections of signals also compares the signals acquired from the at least two UWB antennas with reference measurements.

11. A method for detecting people and/or objects in an interior of a transportation vehicle, the method comprising:
acquiring signals using at least two Ultra-WideBand (UWB) antennas arranged in or on different doors of the transportation vehicle, wherein the at least two UWB antennas are used for communication with at least one ID transmitter and/or a remote control for at least locking and unlocking the doors and are also used to acquire signals indicating detection of people and/or objects in an interior of the transportation vehicle; and
evaluating the signals acquired using the at least two UWB antennas using a control device to generate an evaluation result indicating detection of people and/or objects in the interior of the transportation vehicle,
wherein the evaluation of the signals analyzes reflections of the signals acquired by the at least two UWB antennas by merging signals acquired from the at least two UWB antennas, wherein signals detected in both an active operating mode and a passive operating mode are merged with one another and evaluated as merged signals to derive information about persons and/or objects in the transportation vehicle interior.

12. The method of claim 11, wherein, in the passive operating mode, signals emitted by at least one of the at least two UWB antennas are also acquired by other UWB antennas, wherein the signals acquired by each of the other UWB antennas are also evaluated.

13. The method of claim 11, wherein the evaluation comprises determining a position and/or a change of position of a detected person and/or of a detected object in the interior of the transportation vehicle from the signals acquired by the at least two UWB antennas.

14. The method of claim 11, wherein the evaluation comprises computing a three-dimensional image of the interior of the transportation vehicle from the signals acquired by the at least two UWB antennas.

15. The method of claim 11, wherein, in active operating mode of the at least two UWB antennas, at least one distance between the at least two UWB antennas is determined, wherein the at least one distance determined is compared with at least one specified distance value, and wherein the detection of people and/or objects in the interior of the transportation vehicle is started when the comparison result shows that the determined distance corresponds to the at least one specified distance value.

16. The method of claim 11, wherein an identification code of a detected person and/or of a detected object is recorded or received, wherein the recorded or received identification code is linked to a determined position of the person and/or a determined position of the object in the interior of the transportation vehicle and transmitted to at least one server.

17. The method of claim 11, wherein further UWB antennas arranged in further, different doors of the transportation vehicle are used during the detection, wherein signals acquired in an active operating mode and/or in a passive operating mode are evaluated tomographically.

18. The method of claim 11, wherein the evaluation comprises determining a body posture and/or at least one physiological quantity of a detected person, and/or determining a size and/or dimensions of a detected object.

19. The method of claim 11, wherein the evaluation of the signals also analyzes propagation time and/or a direction-dependent signal attenuation.

20. The method of claim 11, wherein the evaluation analysis of the signals by reflections of signals also compares the signals acquired from the at least two UWB antennas with reference measurements.

* * * * *